(12) United States Patent
Chen et al.

(10) Patent No.: US 8,237,933 B2
(45) Date of Patent: Aug. 7, 2012

(54) METHOD FOR IMAGE CALIBRATION AND APPARATUS FOR IMAGE ACQUIRING

(75) Inventors: Jin-Liang Chen, Hsinchu (TW);
Shih-Hsuan Kuo, Hsinchu (TW);
Chung-Chu Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/177,168

(22) Filed: Jul. 6, 2011

(65) Prior Publication Data

US 2011/0261362 A1   Oct. 27, 2011

Related U.S. Application Data

(62) Division of application No. 12/058,926, filed on Mar. 31, 2008, now Pat. No. 8,005,290.

(30) Foreign Application Priority Data

Jul. 5, 2007   (TW) .............................. 96124430 A

(51) Int. Cl.
*G01B 11/02*   (2006.01)

(52) U.S. Cl. ..................................... 356/497

(58) Field of Classification Search ........... 356/457, 356/497
See application file for complete search history.

(56) References Cited

U.S. PATENT DOCUMENTS

| | | | |
|---|---|---|---|
| 7,068,376 B2 | 6/2006 | De Groot | |
| 2004/0012791 A1* | 1/2004 | Lega et al. | 356/497 |
| 2006/0158657 A1 | 7/2006 | De Lega et al. | |

FOREIGN PATENT DOCUMENTS

| | | |
|---|---|---|
| CN | 1991341 | 7/2007 |
| TW | I269861 | 1/2007 |
| TW | I274849 | 3/2007 |
| TW | 200716944 | 5/2007 |

OTHER PUBLICATIONS

Taiwan Intellectual Property Office, "Office Action", Dec. 2, 2010, Taiwan.
State Intellectual Property Office of the People's Republic of China, "Office Action", Jul. 24, 2009, China.

* cited by examiner

*Primary Examiner* — Tarifur Chowdhury
*Assistant Examiner* — Jonathon Cook
(74) *Attorney, Agent, or Firm* — WPAT, PC; Justin King

(57) ABSTRACT

The present invention relates to a method for image calibration and an apparatus for image acquiring. In the method for image calibration, the image formation position for an image acquiring unit of the apparatus is calibrated according to the relative location of the image acquiring unit to a objective lens of the apparatus, wherein the relative location is determined by calculating the focus index of the image acquired by the image acquiring unit so that a clear and sharp interferogram can be obtained for three dimensional surface profile measuring. In addition, it is possible to obtain a clear and sharp image without any interference fringe outside the coherent range by adjusting the image formation position, which is capable of being utilized for two dimensional defect detection and dimension measurement.

4 Claims, 12 Drawing Sheets

METHOD FOR IMAGE CALIBRATION AND APPARATUS FOR IMAGE ACQUIRING

BACKGROUND OF THE INVENTION

1. Field of the Invention

The present invention generally relates to an image acquiring technology and, more particularly, to an apparatus and a method for image calibration and an apparatus for image acquiring.

2. Description of the Prior Art

A white-light interferometric system cannot be used for performing lateral measurement and defect detection because interference fringes appear in the image formed at the objective focal point due to the interferometric configuration.

To overcome such a problem, U.S. Pat. No. 7,068,376 discloses an interferometric system as shown in FIG. 1. The optical interferometric system 1 comprises a light source 10, a beam splitting unit 11, an interferometric unit 12 and an image acquiring unit 13. The light source 10 generates a light beam, which becomes a collimated light beam after it passes a collimator lens 14. The collimated light beam is reflected by the beam splitting unit 11 to the interferometric unit 12 and thus becomes a measurement light beam and a reference light beam. The measurement light beam is incident on an object to be tested 100 and is reflected thereby back to the interferometric unit 12. Then the measurement light beam is interfered by the reference light beam to form an interfered light beam. The interfered light beam is received by the image acquiring unit 13 after it passes the beam splitting unit 11 so as to form an image with interference fringes.

In the aforementioned prior art, a phase shift method is used to calculate the three-dimensional profile of an object to be tested. Combined operation is performed on a sequence of images acquired by the phase shift method so as to obtain the direct-current (DC) component of the images. The obtained images are free of interference fringes and are used for two-dimensional lateral detection. However, the two-dimensional fringeless images are obtained after the phase shift process, which causes limited imaging range and wastes longer time.

SUMMARY OF THE INVENTION

In one embodiment, the present invention provides a method for image calibration, comprising steps of: acquiring a sequence of interference images; obtaining a sharpness focusing index curve and a contrast focusing index curve corresponding to the sequence of interference images; obtaining a peak of the sharpness focusing index curve and a peak of the contrast focusing index curve; and performing a calibrating process to calibrate a relative position of the peak of the sharpness focusing index curve to the peak of the contrast focusing index curve so as to obtain a sequence of clear interference images.

In one embodiment, the present invention provides a method for image calibration, comprising steps of: acquiring an image free of interference fringes; obtaining a sharpness focusing index curve and a contrast focusing index curve corresponding to the image; obtaining a peak of the sharpness focusing index curve and a peak of the contrast focusing index curve; and performing a calibrating process to calibrate the relative position of the peak of the sharpness focusing index curve to the peak of the contrast focusing index curve so as to obtain a clear image free of interference fringes.

In one embodiment, the present invention provides a method for image calibration, comprising steps of: acquiring an interference image; obtaining a sharpness focusing index and a contrast focusing index corresponding to the interference image; recording the sharpness focusing index and the contrast focusing index; adjusting an image formation position of the interference image; and repeating the aforesaid steps to maximize the sharpness focusing index and the contrast focusing index.

In one embodiment, the present invention provides an apparatus for image acquiring, comprising: a light beam generator, capable of generating a light beam; a beam splitting unit, capable of reflecting the light beam to generate a reflected light beam; an interferoscope set, capable of transforming the reflected light beam into a reference light beam and a measurement light beam incident on an object to be tested and reflected to the interferoscope set so as to combine with the reference light beam to form an interfered light beam emitted into the beam splitting unit; and an image acquiring unit, capable of receiving the interfered light beam from the beam splitting unit so as to acquire an image, the image acquiring unit being coupled to a first actuator on one side.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

One embodiment of the present invention provides a method for image calibration, in which the focusing index is calculated to determine the relative position of the image acquiring unit to the image pick-up position so that a clear image with/without interference fringes is obtained.

The present invention provides an apparatus for image acquiring, in which a charge-coupled device (CCD) of the image acquiring unit and the objective lens position in an interferoscope set are moved so as to directly obtain a clear image outside the coherent range for real-time two-dimensional dimension measurement. The clear image is free of interference fringes and thus can be used in auto-focusing without further processing. Therefore, the precision in auto-focusing is enhanced.

One embodiment of the present invention provides an apparatus for image acquiring, in which a charge-coupled device (CCD) of the image acquiring unit and the objective lens position in an interferoscope set are moved so as to obtain a sequence of high contrast images within the coherent range for three-dimensional surface profile reconstruction using white-light interferometry.

One embodiment of the present invention provides a method for image calibration and an apparatus for image acquiring, in which the imaging quality by the interferometric system is calibrated by auto-focusing. In this embodiment, a clear image can be obtained inside/outside the coherent range using a look-up table (LUT) for two-dimensional dimension measurement and three-dimensional surface profile measurement without changing the objective lens. Therefore, the interferometric system of this embodiment is two-in-one for both two-dimensional dimension measurement and three-dimensional measurement.

The present invention can be exemplified by the preferred embodiment as described hereinafter.

Figure 1:
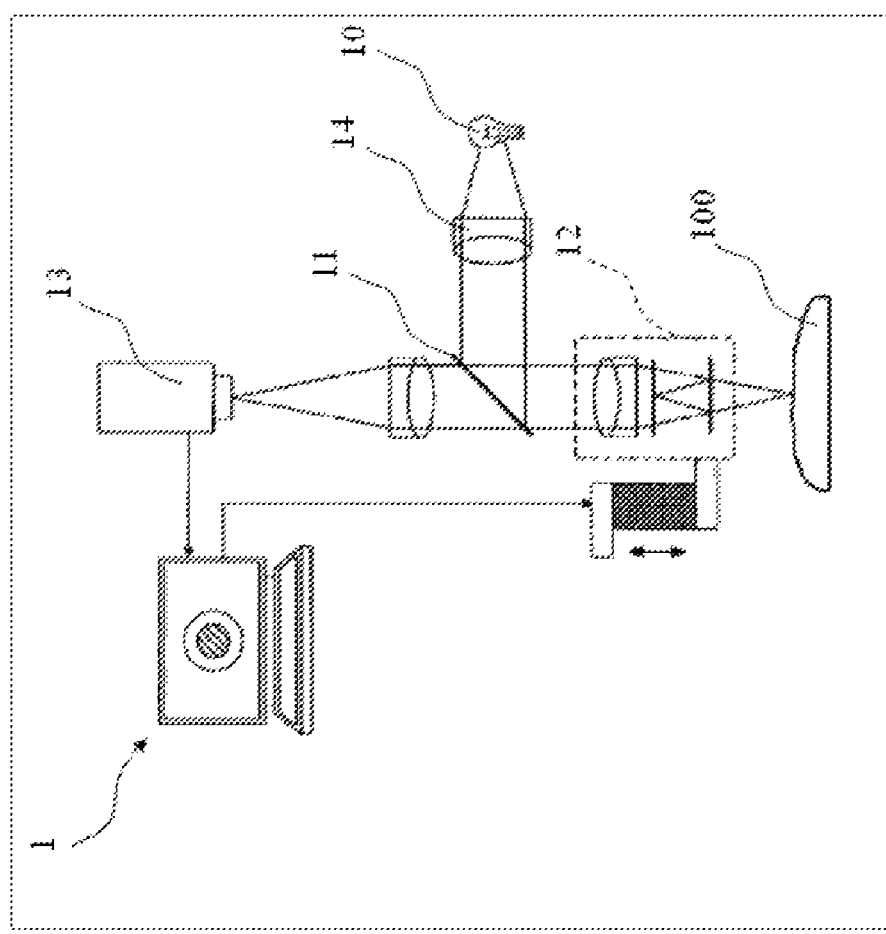
FIG. 1 is a schematic diagram showing a conventional apparatus for image acquiring.
Figure 2:
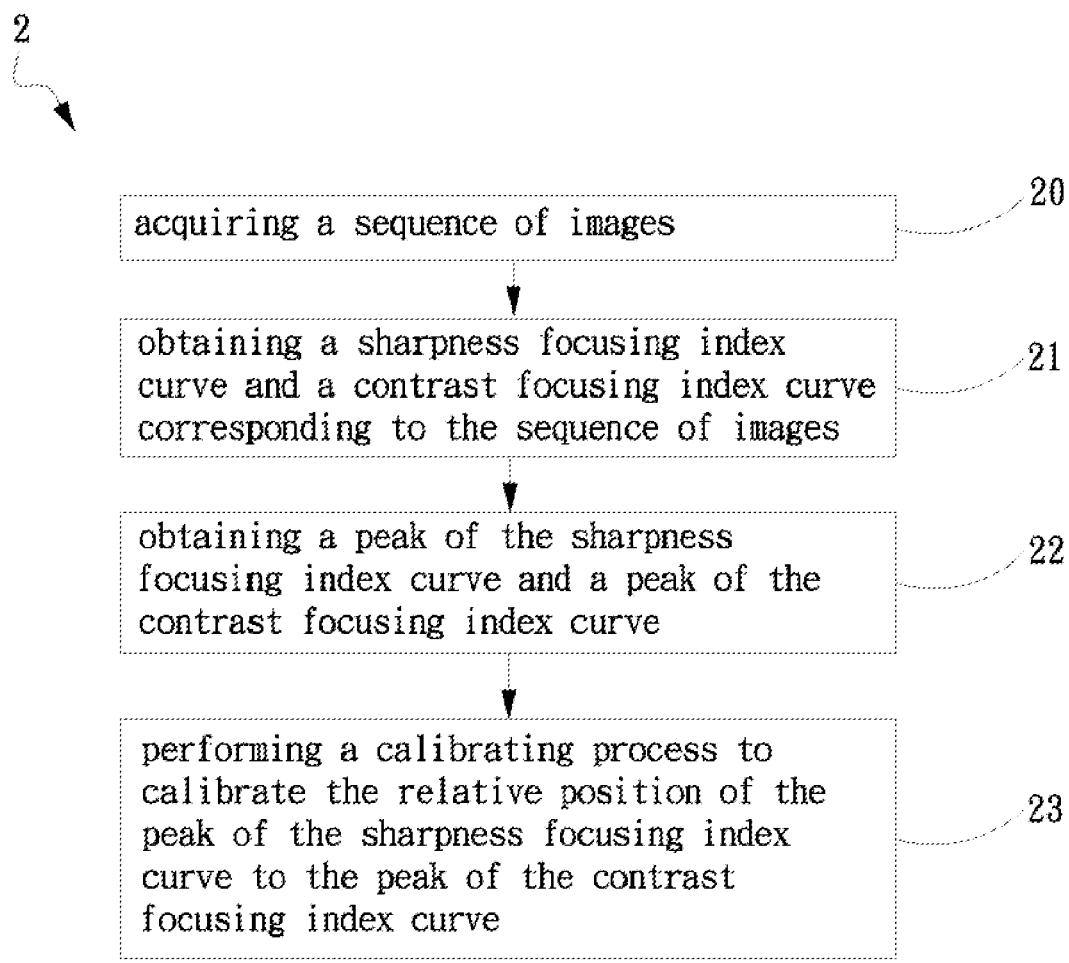
FIG. 2 is a flow-chart showing a method for image calibration according to one embodiment of the present invention.

Please refer to FIG. 2, which is a flow-chart showing a method for image calibration according to one embodiment of the present invention. The method 2 for image calibration is characterized in that the focusing index is calculated so as to determine whether the relative position of the image acquiring unit to the objective image pick-up position is correct for further calibration. The method 2 comprises steps described hereinafter.

In Step 20, a sequence of interference images is acquired. Then in Step 21, a sharpness focusing index curve and a contrast focusing index curve are obtained corresponding to the sequence of interference images. A peak of the sharpness focusing index curve and a peak of the contrast focusing index curve are obtained, as performed in Step 22. At last, a calibrating process is performed to calibrate a relative position of the peak of the sharpness focusing index curve to the peak of the contrast focusing index curve so as to obtain a sequence of clear interference images.

To better understand the method for image calibration according to the present invention, a method for acquiring a clear image with interference fringes by adjusting focusing index is described hereinafter. To begin with, please refer to FIG. 3, which is a schematic diagram showing an apparatus for image acquiring according to one embodiment of the present invention. The apparatus 3 for image acquiring comprises a light beam generator 30, a beam splitting unit 31, an interferoscope set 32 and an image acquiring unit 33. The light beam generator 30 is capable of generating a light beam 90. The beam splitting unit 31 is capable of reflecting the light beam 90 to generate a reflected light beam 91. The interferoscope set 32 is capable of transforming the reflected light beam 91 into a reference light beam 92 and a measurement light beam 93. The measurement light beam 93 is incident on an object 100 to be tested and is reflected to the interferoscope set 32 so as to combine with the reference light beam 92 to form an interfered light beam 94. The interfered light beam 94 is emitted into the beam splitting unit 31. The image acquiring unit 33 is capable of receiving the interfered light beam 94 after it passes the beam splitting unit 31 to form an image.

The image acquiring unit 33 is coupled to a first actuator 34 on one side. The image acquiring unit 33 is a charge-coupled device (CCD) or a complementary metal-oxide-semiconductor field-effect transistor (CMOS) device. Alternatively, the image acquiring unit 33 is a detector capable of detecting light intensity. The first actuator 34 is a motor-driven actuator, a piezoelectric actuator or other devices capable of moving the image acquiring unit so as to calibrate the position of the image acquiring unit 33. Moreover, the interferoscope set 32 is coupled to a second actuator 35 on one side. The second actuator 35 is a motor-driven actuator or a piezoelectric actuator so as to calibrate the relative position of objective lens 320 to the object 100 to be tested in the interferoscope set 32.

Figure 3:
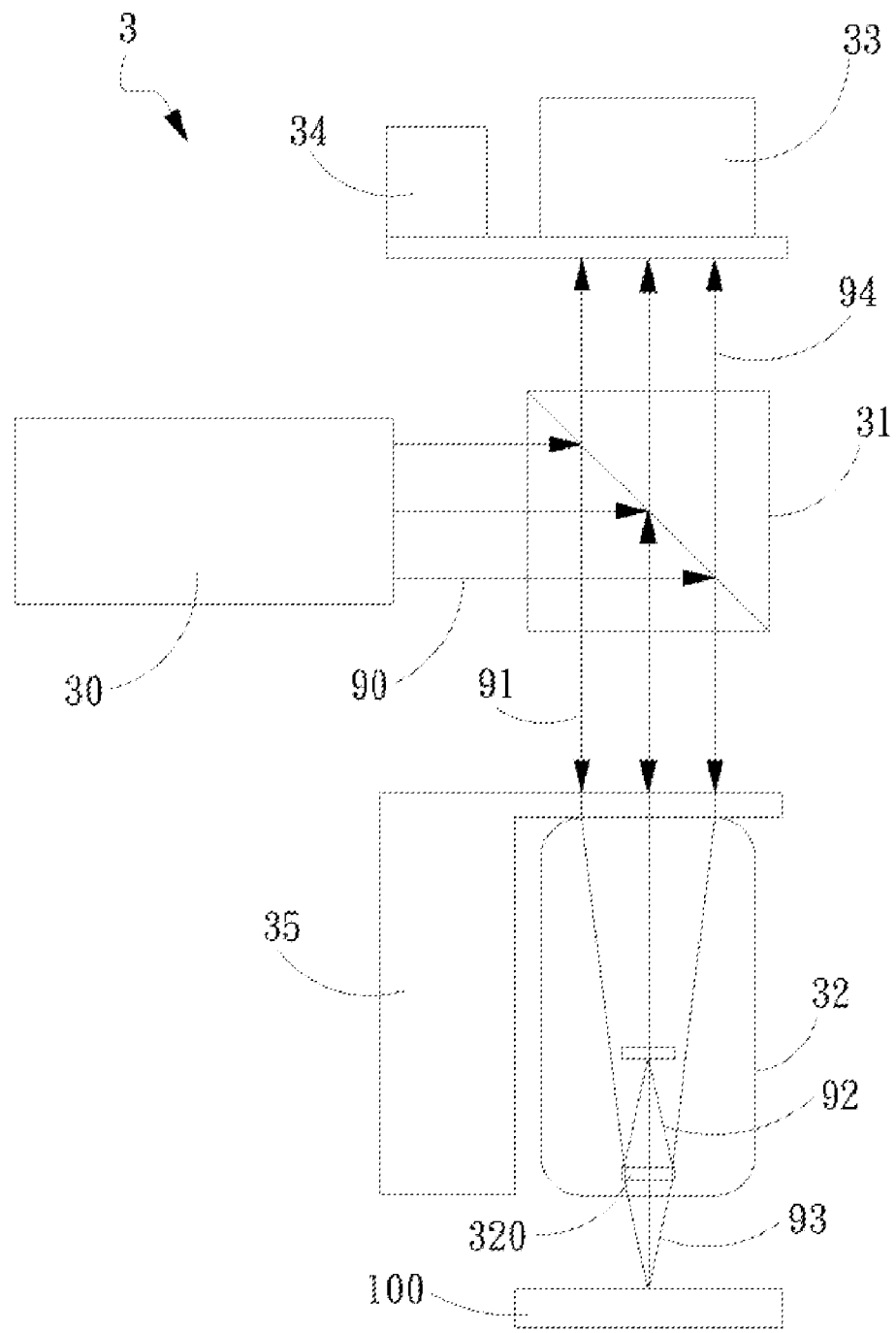
FIG. 3 is a schematic diagram showing an apparatus for image acquiring according to one embodiment of the present invention.
Figure 4A:
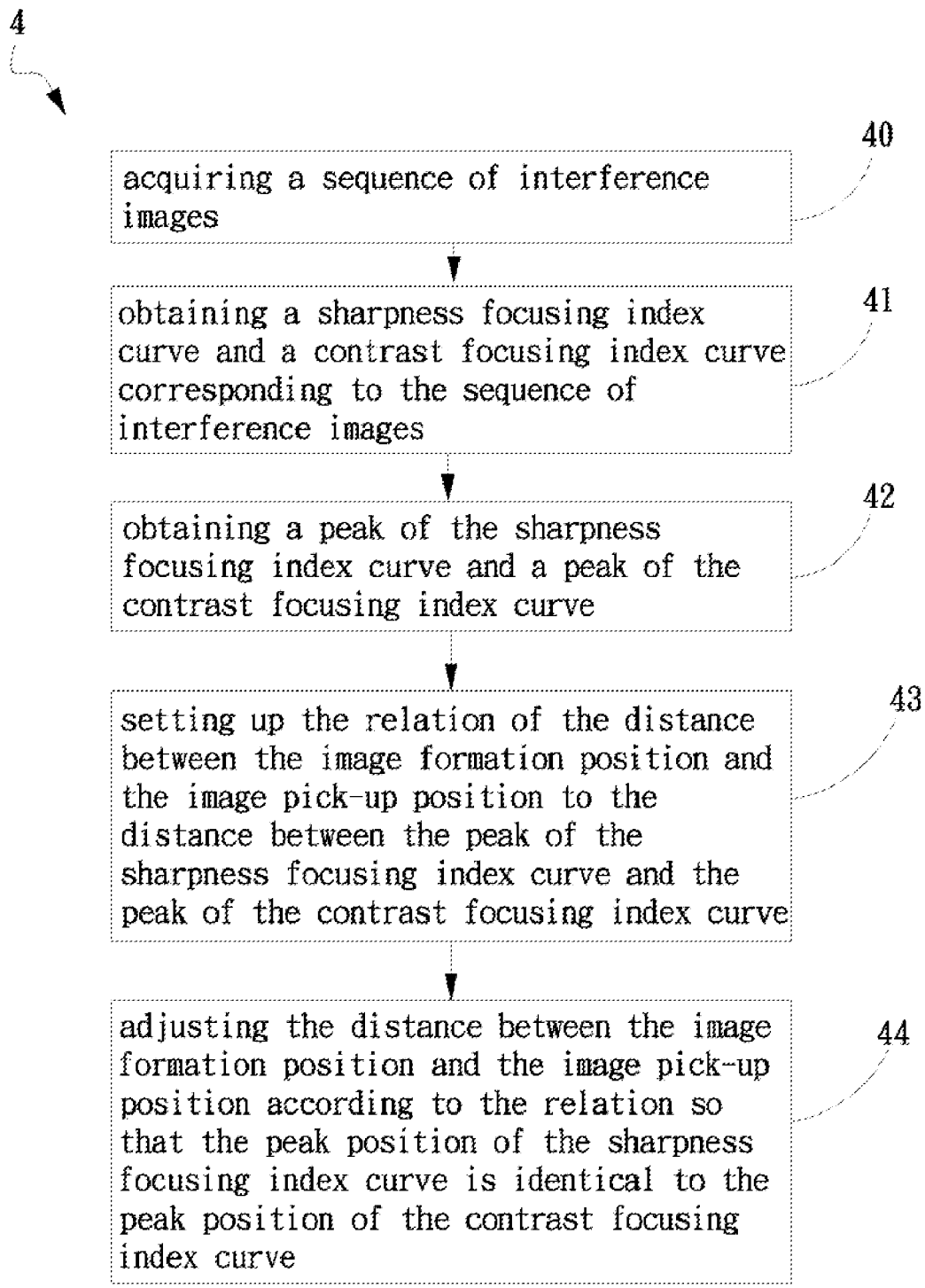
FIG. 4A is a flow-chart showing a method for image calibration on a sequence of interference images according to one embodiment of the present invention.

Please refer to FIG. 4A and FIG. 3, wherein FIG. 4A is a flow-chart showing a method for image calibration on a sequence of interference images according to one embodiment of the present invention. The method 4 for image calibration comprises steps as described hereinafter.

To begin with, in Step 40, a sequence of interference images is acquired. The sequence of interference images is acquired by adjusting the position of the image acquiring unit 33 so as to acquire the sequence of interference images in the coherent range.

Figure 4C:
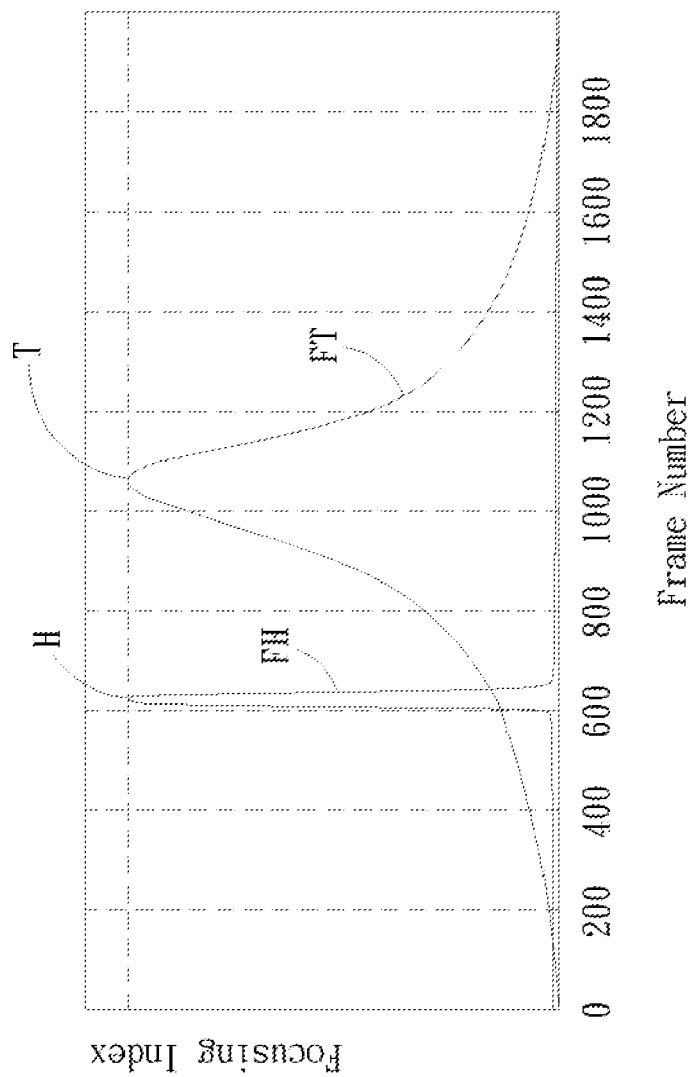
FIG. 4C is a graph showing a sharpness focusing index curve and a contrast focusing index curve according to FIG. 4B.
Figure 4B:
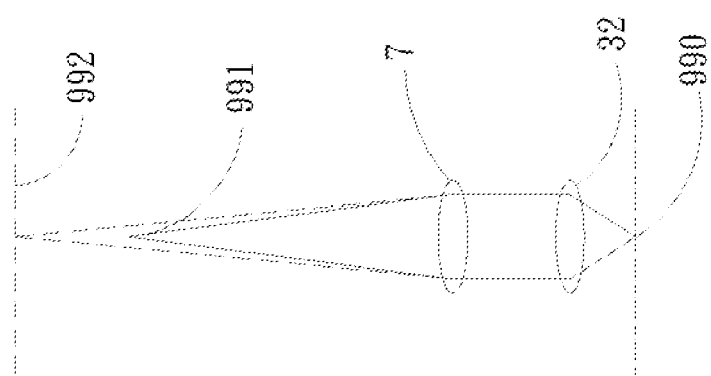
FIG. 4B is a schematic diagram showing an image acquiring unit and an interferoscope set according to one embodiment of the present invention.

In Step 41, a sharpness focusing index curve and a contrast focusing index curve are obtained corresponding to the sequence of interference images. Please refer to FIG. 4B and FIG. 4C, wherein FIG. 4B is a schematic diagram showing an image acquiring unit and an interferoscope set that acquire the sequence of interference images and FIG. 4C is a graph showing a sharpness focusing index curve and a contrast focusing index curve according to FIG. 4B. In FIG. 4B, 990 denotes an image pick-up focal point of an objective lens and 991 denotes an image formation position corresponding to 990. 7 denotes an optical system that comprises the light beam generator 30, the beam splitting unit 31 and part of the interferoscope set 32 in FIG. 3. In one embodiment, the optical system 7 is a microscope set. When the image acquiring unit 33 is not located at a proper image formation position, for example, position 992 in the figure, the image acquiring unit 33 will acquire a sequence of blur images. Meanwhile, the sharpness focusing index curve and the contrast focusing index curve are as shown in FIG. 4C.

In the present invention, the focusing index is an index for image evaluation. The sharpness focusing index curve is an index for calculating the difference of content values of adjacent pixels so as to evaluate the sharpness of the sequence of interference images. The contrast focusing index curve is an index for calculating the statistic distribution of content values of pixels so as to evaluate the contrast of the sequence of interference images. Both the sharpness focusing index curve and the contrast focusing index curve can be obtained by using a spatial frequency distribution identification rule such as multi-coefficient correlation, image differentiation, depth of peaks and valleys, image contrast, histogram or frequency-domain analysis.

Figure 5A:
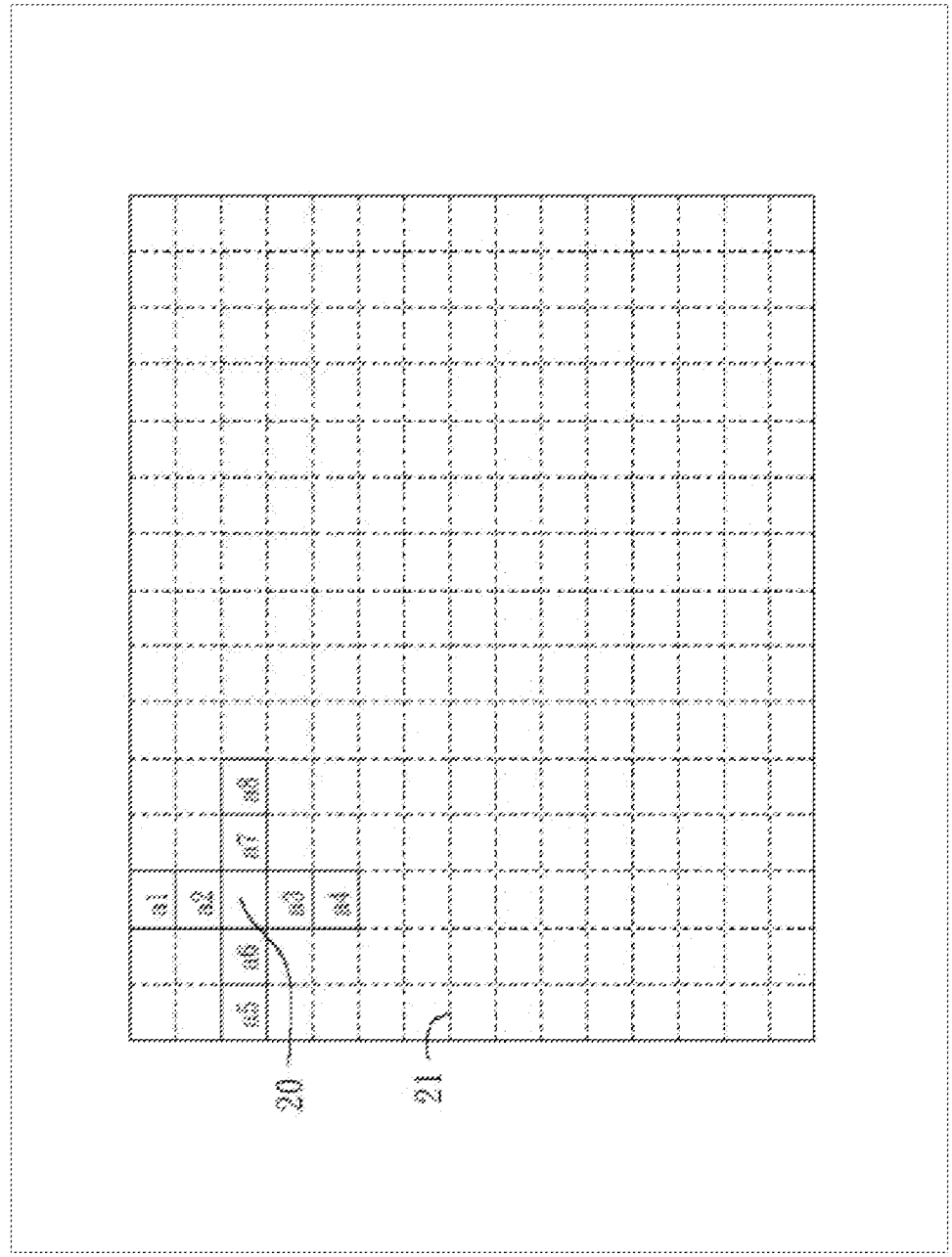
FIG. 5A is a schematic diagram showing the relation between the image and the image mask.

As shown in FIG. 5A, the image sharpness is calculated by performing spatial convolution of a cross-shape mask 20 and an image 21. The convolution sum is the sharpness value of the image 21. More particularly, the mask 20 is symmetrical in shape and deploys the weighting values a1~a8 and the weighted positions. Convolutions of the weightings on the mask 20 and the pixel values corresponding to weighted positions on the image 21 are performed and the convolution results are summed. Then, the same operation is performed after the mask 20 is moved to a next position where operation is to be performed. The sharpness value of the image 21 is thus obtained by summing all the convolution results. Moreover, the sharpness value of the image 21 can also be obtained by analysis and calculation over the frequency domain.

Figure 5B:
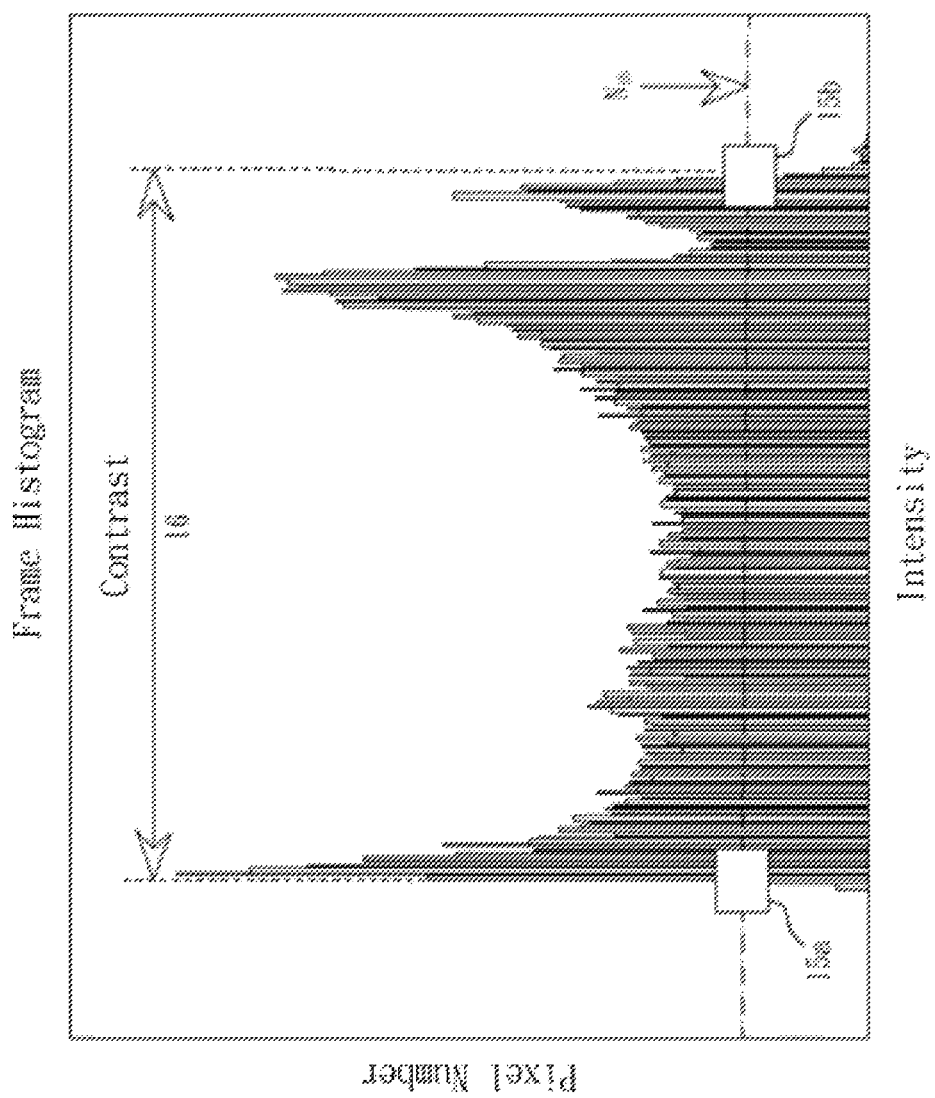
FIG. 5B is a frame histogram showing the relation between the frame number and the intensity.

As shown in FIG. 5B, the contrast is the width of intensity distribution of pixels, i.e., the width 16 of the frame histogram, which is the distance between the smallest pixel value 15$a$ and the largest pixel value 15$b$, filtered by a threshold value Nth to filter out the pixel values with pixel number below the threshold value Nth. The image intensity is obtained by analysis and calculation of the pixel intensity, for example, the sum of the pixel intensities or the average intensity of adjacent pixels in an image region. The image intensity is the average luminance or the maximum luminance of the pixels in an image.

In Step 42, a peak of the sharpness focusing index curve and a peak of the contrast focusing index curve are obtained. Please refer to FIG. 4C, wherein FH denotes the contrast focusing index curve of the sequence of interference images, FT denotes the sharpness focusing index curve of the sequence of interference images and H denotes the peak of the contrast focusing index curve. The peak position indicates the position where the sequence of interference images appears. T denotes the peak of the sharpness focusing index curve. The peak position indicates the position where the sequence of clear images appears. When the interferometic system is correctly configured, H and T appear at the same position where the sequence of clear interference images appears. When the interferometic system is not correctly configured, H and T appear at different positions, as shown in FIG. 4B.

To obtain the sequence of clear interference images, Step 43 is performed so as to set up a relation of a distance between an image formation position and an image pick-up position to a distance between the peak of the sharpness focusing index curve and the peak of the contrast focusing index curve. To realize Step 43, the image acquiring unit 33 in FIG. 3 is moved and the change of the distance between the peak H of the contrast focusing index curve FH and the peak T of the sharpness focusing index curve FT is observed. By repeating the aforementioned steps, the relation can be acquired.

Figure 4D:
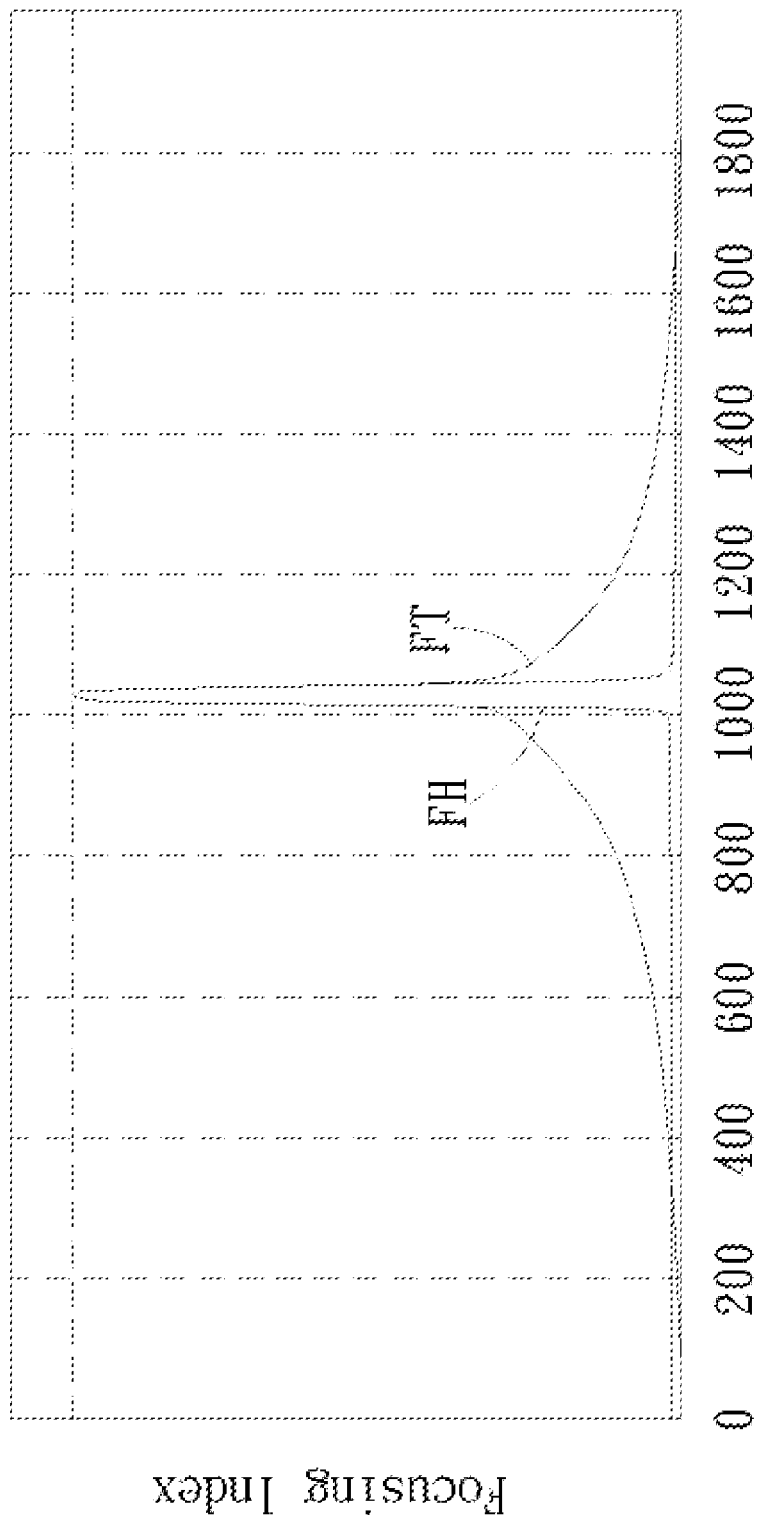
FIG. 4D is a graph wherein a peak of the sharpness focusing index curve and a peak of the contrast focusing index curve are aligned.

Finally, Step 44 is performed. The distance between the image formation position and the image pick-up position is adjusted according to the relation so that the peak position of the sharpness focusing index curve is identical to the peak position of the contrast focusing index curve, as shown in FIG. 4D. Therefore, a sequence of clear interference images can be acquired for three-dimensional profile reconstruction.

More particularly, to calibrate the image formation position is to calibrate the position of the image acquiring unit 33. To calibrate the image pick-up position is to calibrate the position of the objective lens 320 of the interferoscope set 32. In other words, the peak H and the peak T can be aligned so as to acquire the sequence of clear interference images by adjusting the position of the objective lens 320 or the position of the image acquiring unit 33 in the apparatus 3 for image acquiring in FIG. 3 according to the relation obtained in Step 43. Furthermore, in Step 43, a relation table can be set up so that the position of the image acquiring unit 33 and the position of the objective lens 320 of the interferoscope set 32 can be automatically calibrated to align the peak H and the peak T according to the information stored in the relation table.

Figure 6A:
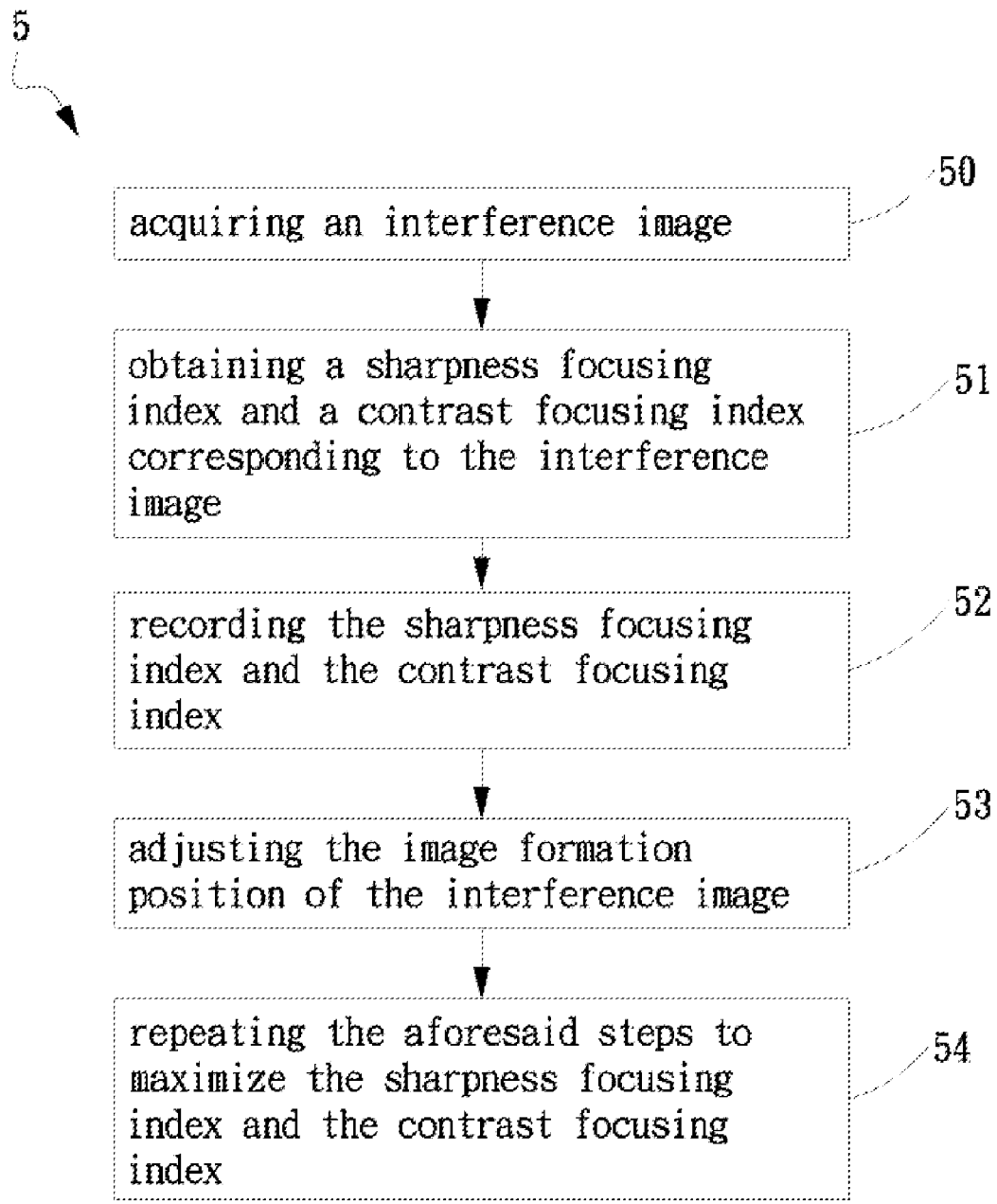
FIG. 6A is a flow-chart showing a method for image calibration on an image according to another embodiment of the present invention.

Please refer to FIG. 6A and FIG. 3, wherein FIG. 6A is a flow-chart showing a method for image calibration on an image according to another embodiment of the present invention. The method 5 for image calibration comprises steps as described hereinafter.

Figure 6B:
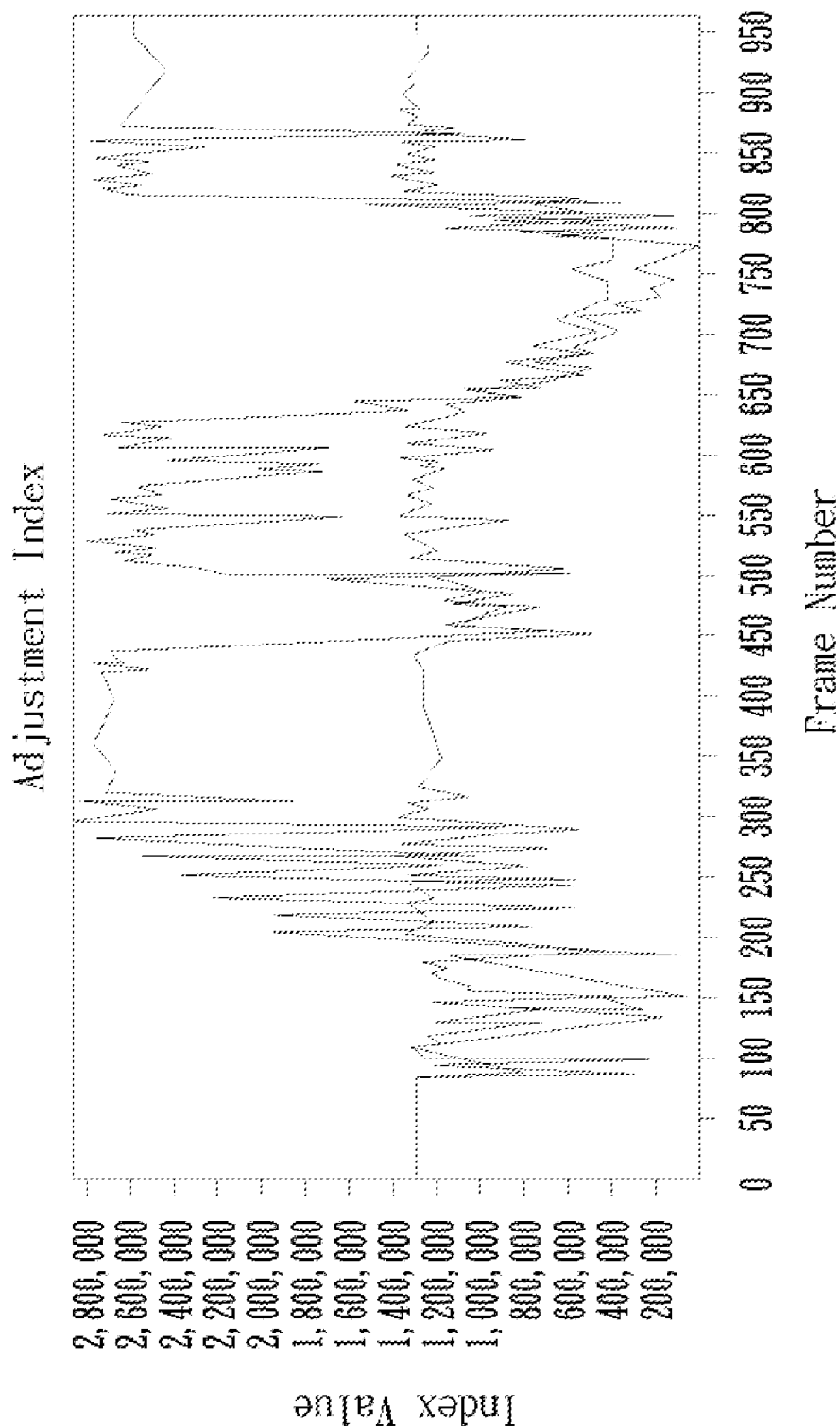
FIG. 6B is a graph showing the change of a sharpness focusing index curve and a contrast focusing index curve according to FIG. 6A.

To begin with, in Step 50, an interference image is acquired. The Step 50 is similar to Step 40, thus detailed description is omitted. Then in Step 51, a sharpness focusing index and a contrast focusing index are obtained corresponding to the interference image. In Step 52, the sharpness focusing index and the contrast focusing index are recorded. In Step 53, an image formation position of the interference image is adjusted. More particularly, in Step 53, the position of the image acquiring unit 33 is adjusted. Please refer to FIG. 6B, which is a graph showing the change of a sharpness focusing index curve and a contrast focusing index curve according to FIG. 6A. The aforesaid steps are repeated to maximize the sharpness focusing index and the contrast focusing index, as performed in Step 54, so as to acquire a clear interference image for three-dimensional profile reconstruction using white-light interferometry.

Figure 7A:
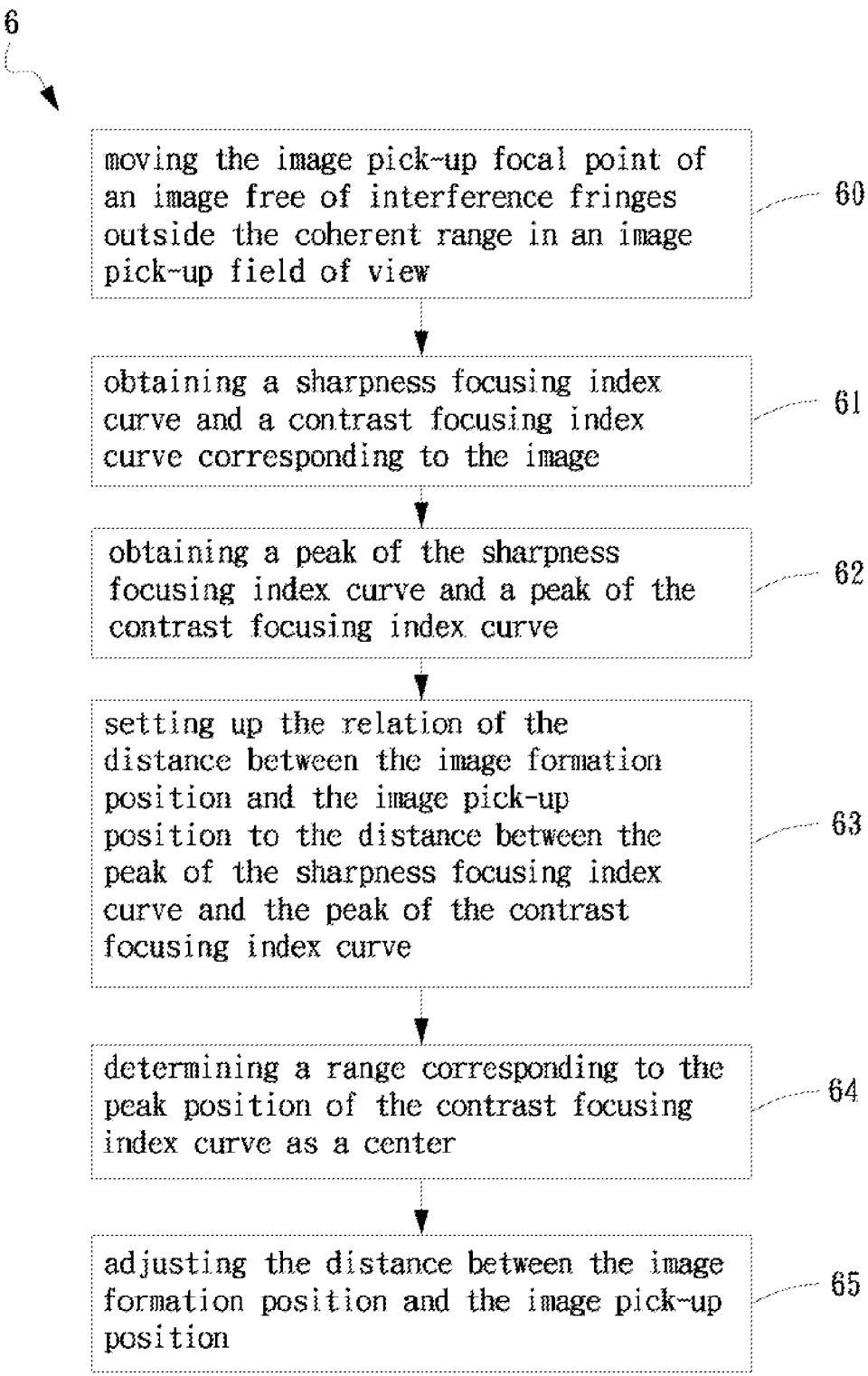
FIG. 7A is a flow-chart showing a method for image calibration on an image free of interference fringes according to the present invention.

Please refer to FIG. 7A and FIG. 3, wherein FIG. 7A is a flow-chart showing a method for image calibration on an image free of interference fringes according to the present invention. The method 6 for image calibration comprises steps as described hereinafter.

Figure 7C:
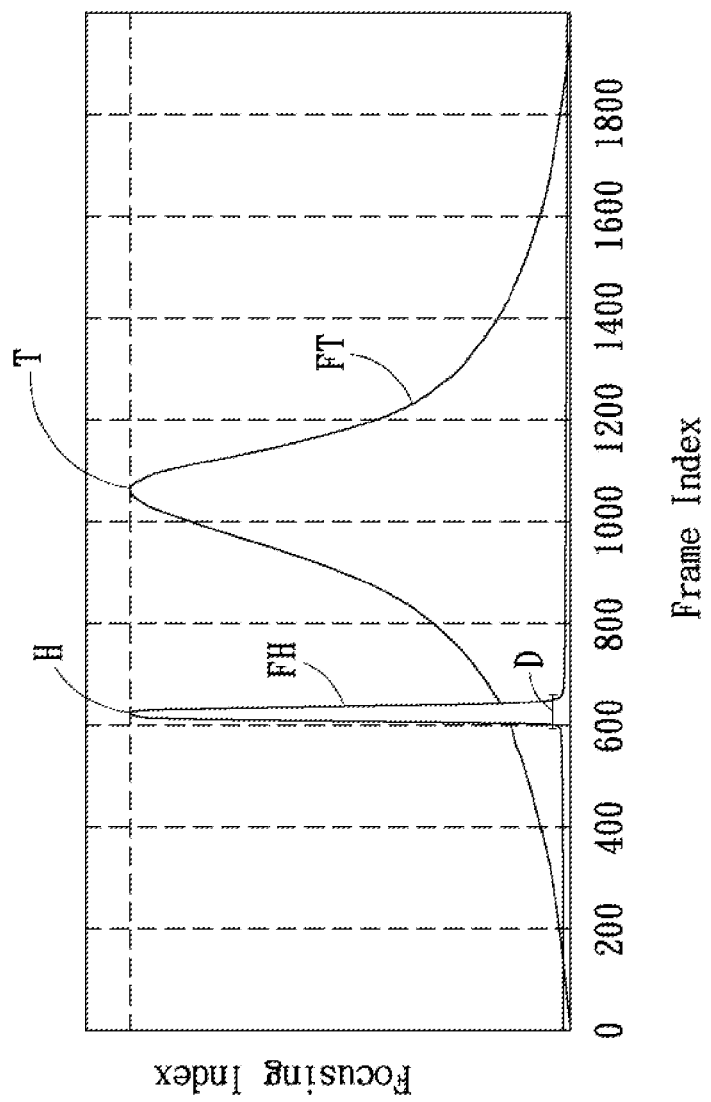
FIG. 7C is a schematic diagram showing a range centered at the peak of the contrast focusing index curve.
Figure 7B:
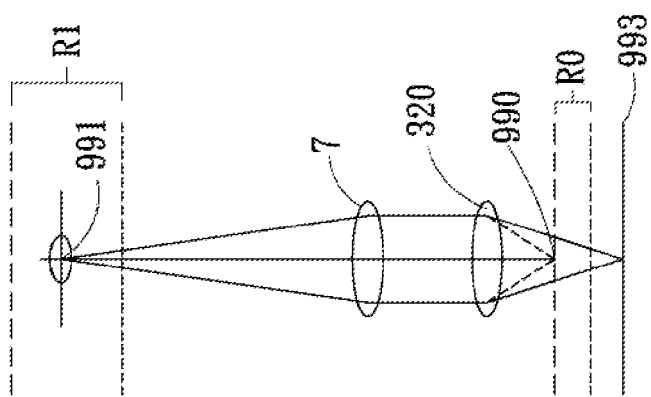
FIG. 7B is a schematic diagram showing an image acquiring unit and an interferoscope set according FIG. 7A.

To begin with, in Step 60, the position of the image acquiring unit 33 and the position of the interferoscope set 32 are calibrated by moving an image pick-up focal point of the objective lens 320 of the interferoscope set 32 to an image pick-up position 993 outside a coherent range where interference takes place in an image pick-up field of view so as to acquire an image free of interference fringes. Please refer to FIG. 7B, in which the position of the image acquiring unit 33 is calibrated by adjusting the image acquiring unit 33 to move in a range R1 around an imaging focal point 991. 7 denotes an optical system that comprises the light beam generator 30, the beam splitting unit 31 and part of the interferoscope set 32 in FIG. 3. In one embodiment, the optical system 7 is a microscope set. The position of the interferoscope set 32 is adjusted by moving the image pick-up focal point of the objective lens 320 of the interferoscope set 32 outside a coherent range R0 where interference takes place in an image pick-up field of view so as to acquire a clear image without interference fringes.

In Step 61, a sharpness focusing index curve and a contrast focusing index curve corresponding to the image without interference fringes are obtained. Then in Step 62, a peak of the sharpness focusing index curve and a peak of the contrast focusing index curve are obtained. A relation of a distance between an image formation position and an image pick-up position to a distance between the peak of the sharpness focusing index curve and the peak of the contrast focusing index curve is set up, as performed in Step 63. Steps 61 to 63 are performed similarly to the previously disclosed, and thus detailed description thereof is omitted.

After the relation is set up, Step 64 is performed to determine a range corresponding to the peak position of the contrast focusing index curve as a center. Please refer to FIG. 7C, which is a schematic diagram showing a range D centered at the peak H of the contrast focusing index curve FH. The size of the range D is determined according to the user's need.

Finally, Step 65 is performed to adjust the distance between the image formation position and the image pick-up position according to the relation so that the peak T of the sharpness focusing index curve FT is outside the range D so as to exhibit the clear image free of interference fringes for two-dimensional defect detection and dimension measurement.

According to the above discussion, it is apparent that the present invention discloses a method for image calibration and an apparatus for image acquiring, in which a clear image can be obtained inside/outside the coherent range using a look-up table (LUT) for two-dimensional dimension measurement and three-dimensional surface profile measurement without changing the objective lens. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An apparatus for image acquiring, comprising:
    a light beam generator, capable of generating a light beam;
    a beam splitting unit, capable of reflecting the light beam to generate a reflected light beam;
    an interferoscope set, capable of transforming the reflected light beam into a reference light beam and a measurement light beam incident on an object to be tested and reflected to the interferoscope set so as to combine with the reference light beam to form an interfered light beam emitted into the beam splitting unit; and
    an image acquiring unit coupled to a first actuator on one side, capable of receiving the interfered light beam from the beam splitting unit so as to form an image, obtaining a peak of the sharpness focusing index curve and a peak of the contract focusing index curve, and performing a calibration process to calibrate a relative position of the peak of the sharpness focusing index curve to the peak of the contrast focusing index curve so as to obtain a sequence of clear interference images.

2. The apparatus for image acquiring as recited in claim 1, wherein the image acquiring unit is a charge-coupled device (CCD) or a complementary metal-oxide-semiconductor field-effect transistor (CMOS) device.

3. The apparatus for image acquiring as recited in claim 1, wherein the first actuator is a motor-driven actuator or a piezoelectric actuator so as to calibrate the position of the image acquiring unit.

4. The apparatus for image acquiring as recited in claim 1, wherein the interferoscope set is coupled to a second actuator on one side, the second actuator being a motor-driven actuator or a piezoelectric actuator so as to calibrate the position of the interferoscope set.

* * * * *